United States Patent
Broadbent et al.

(10) Patent No.: US 9,810,325 B2
(45) Date of Patent: Nov. 7, 2017

(54) COMPONENT SEAL

(71) Applicants: Thomas Broadbent, Glossop (GB); Steven Cox, Borrowash (GB)

(72) Inventors: Thomas Broadbent, Glossop (GB); Steven Cox, Borrowash (GB)

(73) Assignee: AES Engineering Ltd., Rotherham (GB)

( * ) Notice: Subject to any disclaimer, the term of this patent is extended or adjusted under 35 U.S.C. 154(b) by 26 days.

(21) Appl. No.: 14/540,920

(22) Filed: Nov. 13, 2014

(65) Prior Publication Data

US 2015/0130141 A1    May 14, 2015

(30) Foreign Application Priority Data

Nov. 13, 2013  (GB) .................................. 1320063.9

(51) Int. Cl.
*F16J 15/34* (2006.01)
*F16J 15/36* (2006.01)

(52) U.S. Cl.
CPC ............... *F16J 15/34* (2013.01); *F16J 15/36* (2013.01)

(58) Field of Classification Search
CPC .................................... F16J 15/34; F16J 15/36
USPC ....... 277/373, 392, 391, 371, 372, 375, 403, 277/348, 374
See application file for complete search history.

(56) References Cited

U.S. PATENT DOCUMENTS

| | | | | |
|---|---|---|---|---|
| 2,728,591 A | * | 12/1955 | Solari | F16J 15/36 277/392 |
| 4,483,545 A | * | 11/1984 | Bush | F16J 15/024 277/322 |
| 5,558,343 A | * | 9/1996 | Aparicio, Jr. | F16J 15/36 277/393 |
| 5,639,098 A | * | 6/1997 | MacDonald | B63H 23/321 277/391 |
| 5,725,219 A | * | 3/1998 | Gilbert | F16J 15/36 277/377 |
| 2008/0048400 A1 | * | 2/2008 | Dahlheimer | F16J 15/36 277/391 |

* cited by examiner

*Primary Examiner* — Matthieu F Setliff
*Assistant Examiner* — Thomas Neubauer
(74) *Attorney, Agent, or Firm* — Edwin D. Schindler

(57) ABSTRACT

A mechanical seal includes an elastomeric member, a spring biasing device, a longitudinally floating first member having a seal face, a longitudinally non-floating second member and a longitudinally floating third member. The elastomeric member is in sealing engagement with the first member, second member and third member and the spring biasing device is longitudinally positioned between the first member and the second member. One of either the first member or the second member is provided with at least one protruding male portion and the other member of either the first member or the second member is provided with corresponding female portion into which the male portion locates.

8 Claims, 4 Drawing Sheets

COMPONENT SEAL

BACKGROUND OF THE INVENTION

The present invention relates, generally, to mechanical seals, which are fitted to rotating equipment in virtually all types of industries.

A mechanical seal comprises a "floating" component which is mounted axially movable around the rotary shaft of, for example, a pump or a "static" component which is axially fixed, typically being secured to a housing. The floating component has a flat annular end face, i.e., its seal face, directed towards a seal face of the static component. The floating component is urged towards the static component to close the seal faces together to form a sliding face seal, usually by means of one or more spring members. In use, one of the floating and static components rotates; this component is therefore referred to as the rotary component. The other of the floating and static components does not rotate and is referred to as the stationary component.

Those seals whose floating component is rotary are described as rotary seals. If the floating component is stationary, the seal is referred to as a stationary seal.

If the sliding seal between the rotary and stationary components are assembled and pre-set prior to despatch from the mechanical seal manufacturing premises, the industry terminology for this is "cartridge seal." Alternatively, if the rotary and stationary components are despatched individually (unassembled) from the mechanical seal manufacturing premises, then the industry terminology used is "component seal."

More particularly, this invention relates to a component seal which is used in applications where there is a large amount of contaminates in the product. These contaminates can become entrenched between moving components in traditional designs of mechanical seals causing these components to "hang up" and therefore resulting in premature failure of the seal. One common method of stopping these contaminates becoming entrenched is to use a rubber component such as a bellows to create a seal between moving components. The limitation to these bellows is that they are either commonly used with a single spring component seals which create uneven face pressures or the bellows can become detached allowing contaminates to enter the bellows sealed area.

SUMMARY OF THE INVENTION

The present invention comprises a mechanical seal for providing a fluid-tight seal between relatively rotatable elements with the inventive mechanical seal preferably comprising an elastomeric member, spring biasing means, a longitudinally floating first member, which comprises a seal face, a longitudinally non-floating second member and a longitudinally floating third member. The elastomeric member is preferably in a sealing engagement with the first member, second member and third member; the spring biasing means being longitudinally positioned between the seal first and second members and with one of either the first member or the second members being provided with at least one, preferably longitudinally, protruding male portion, and the other member of either the first or second members being provided with corresponding female portion into which the male portion locates.

Preferably, the seal face is a separate component to the first member and is axially and radially retained by the first member, thereby allowing it to be centroidally loaded; different materials being fitted in a common first member and also reducing the complexity and size of the seal face which tends to be expensive exotic materials.

Preferably the third member is in engagement with the first member providing a cavity in which the elastomeric member is retained.

More preferably, there is a groove on the outer surface of the third member for allowing an inwardly protruding portion of the elastomeric member to engage, thereby ensuring that the elastomeric bellows member does not move during the assembly of the third member.

More preferably, there are annular surfaces for the second member that are larger in diameter than the third member, thereby allowing axial engagement of the components and so limiting the level of axial movement that the third member can achieve during assembly improving fitment.

More preferably, the outermost surface of the third member is angled so as to reduce the diameter of the area which is in closest proximity to the sealing face, thereby improving fluid flow around the sealing faces aiding sealing performance.

More preferably, one or more scallops are located around the axis of the diameter, thereby allowing the third member to be installed with the use of a tool and, further, potentially increasing fluid flow around the sealing faces.

Preferably, the elastomeric bellows member comprising of one or more convolutions are located for allowing the floating members to move in an axial direction and thereby maintaining sealing face pressure with axial movement of the shaft.

More preferably, the one or more convolution outwardly extend when the floating members move toward the second member, thereby ensuring that axial movement of the first member is not restricted.

More preferably, an elastomeric member has an inner diameter that is smaller than the outer diameter of the second member, thereby ensuring that the second member does not become detached from the elastomeric bellows during installation of the seal.

Preferably, a first member, in which an annular groove resides and an elastomeric toroidal sealing member is located, provides radially restrictive contact between the first and second members.

Other objects and features of the present invention will become apparent when considered in combination with the accompanying drawing figures, which illustrate certain preferred embodiments of the present invention. It should, however, be noted that the accompanying drawing figures are intended to illustrate only select preferred embodiments of the claimed invention and are not intended as a means for defining the limits and scope of the invention.

BRIEF DESCRIPTION OF THE DRAWING FIGURES

In the drawing, wherein similar reference numerals and symbols denote similar features throughout the several views.

DETAILED DESCRIPTION OF THE DRAWING FIGURES AND PREFERRED EMBODIMENTS

The general principle of mechanical seals in accordance with the present invention may be used not only in the case where the shaft is a rotary member and the housing is the stationary member, but also the reverse situation, that is to say, in which the shaft is stationary and the housing is rotary.

Furthermore, the present invention may be embodied in both rotary and stationary arrangements, cartridge and component seals with metallic components as well as non-metallic components.

Figure 1:
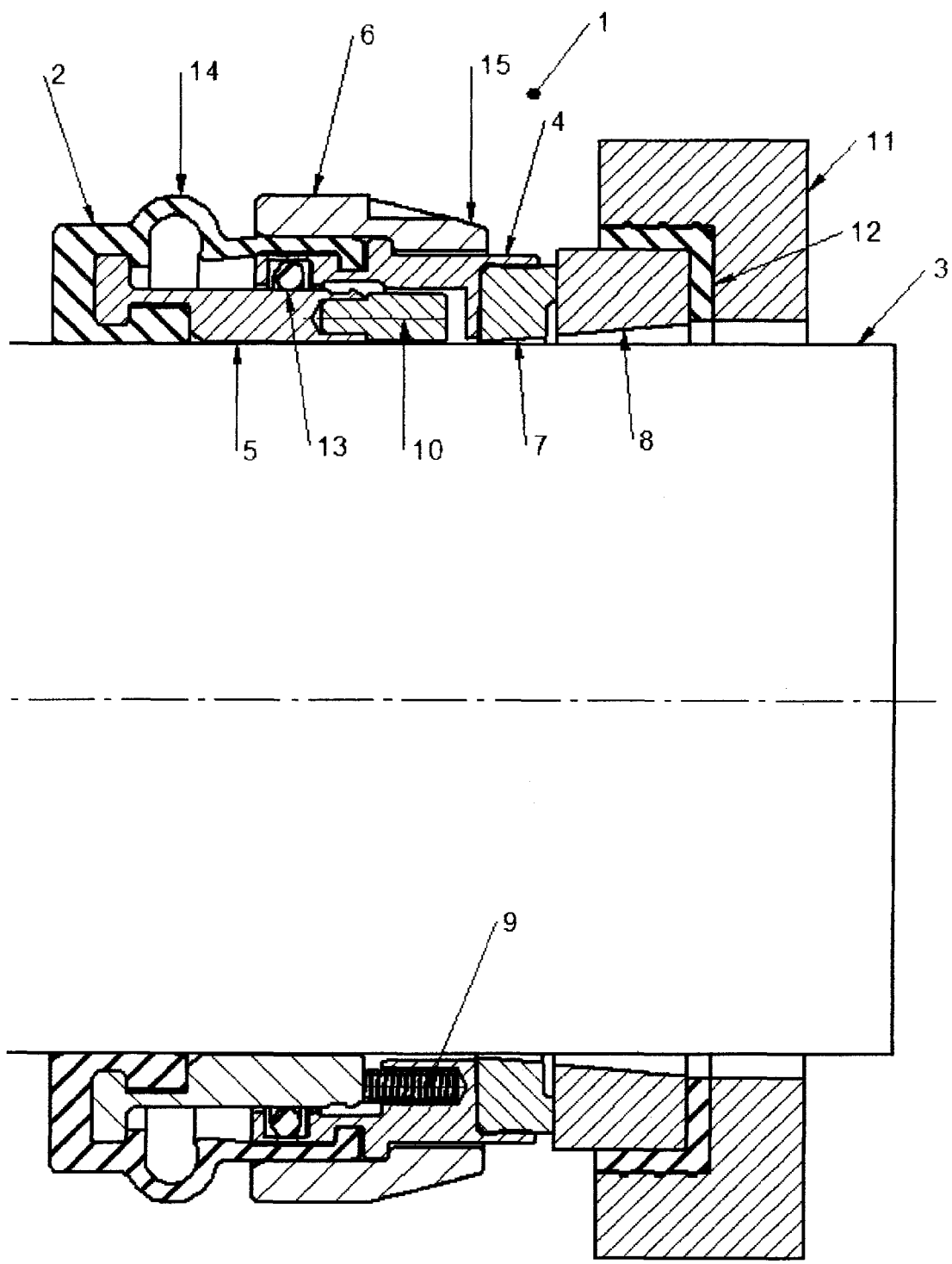
FIG. 1 is a sectional side elevational view of a mechanical seal in accordance with a first preferred embodiment of the present invention.

Referring to FIG. 1 of the accompanying drawings, the invention 1 incorporates an elastomeric bellows member 2, which is radially disposed in operation between a shaft 3 and first, second and third members, 4, 5 and 6, respectively. The second member 5 squeezes the elastomeric bellows member 2, thereby providing a seal between the elastomeric bellows member 2, the second member 5 and the shaft member 3. The third member 6 squeezes the elastomeric bellows member 2 onto the first member 4 providing a seal between the members. A primary sealing face 7 resides in the first member 4 and is urged toward the second sealing face 8 via a plurality of springs 9 which reside in a plurality of cavities in the first member 4 and are compressed in operation between the cavities and the second member 5. One or more pins 10 are located in the second member 5 protruding into an opposing cavity in the first member 4, thereby providing axial drive between the shaft 3, bellows member 2, second member 5 and the first member 4. The second sealing face 8 is in sealing engagement with the pump housing 11 via a secondary elastomeric boot member 12. A tertiary elastomeric member 13 is located in a groove located on the inner diameter of the first member 4 providing radial alignment means between the first and second members, 4 and 5, respectively.

The elastomeric bellows member 2 contains a convolution 14 between the outermost diameter of the second member 5 and the first and third members, 4 and 6, respectively, thereby providing an area for the elastomeric bellows member 2 to distort radially when the present invention 1 is installed. The profile of the third member 6 is designed so that a portion of its inner diameter is smaller than the outermost diameter of the first member 4, thereby limiting the extent that it can contact the elastomeric bellows member 2, when assembled. The profile of the third member 6 also contains an angled, or tapered, portion 15, i.e., the diameter closest to the first sealing face 7 is reduced with respect to the other end.

Figure 2:
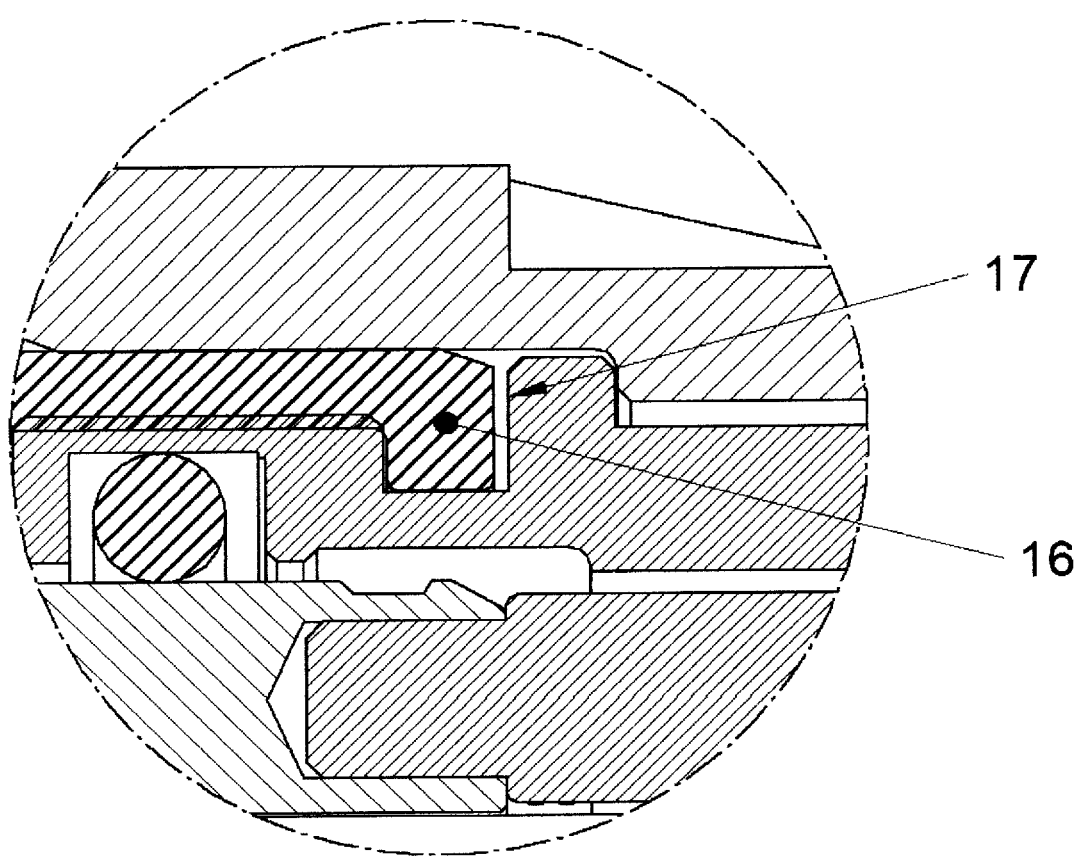
FIG. 2 is a magnified sectional side elevational view of the sealing section between the first, third and elastomeric bellows members of the embodiment of FIG. 1.

Referring to FIG. 2, the profile of the elastomeric bellows member 2 contains an inwardly protruding portion 16, which locates into a groove 17 in the outer surface of the first member 4 to ensure the elastomeric bellows member 2 is interlockingly retained therein and will not detach from the first member 4 during assembly of the third member 6.

Figure 3:
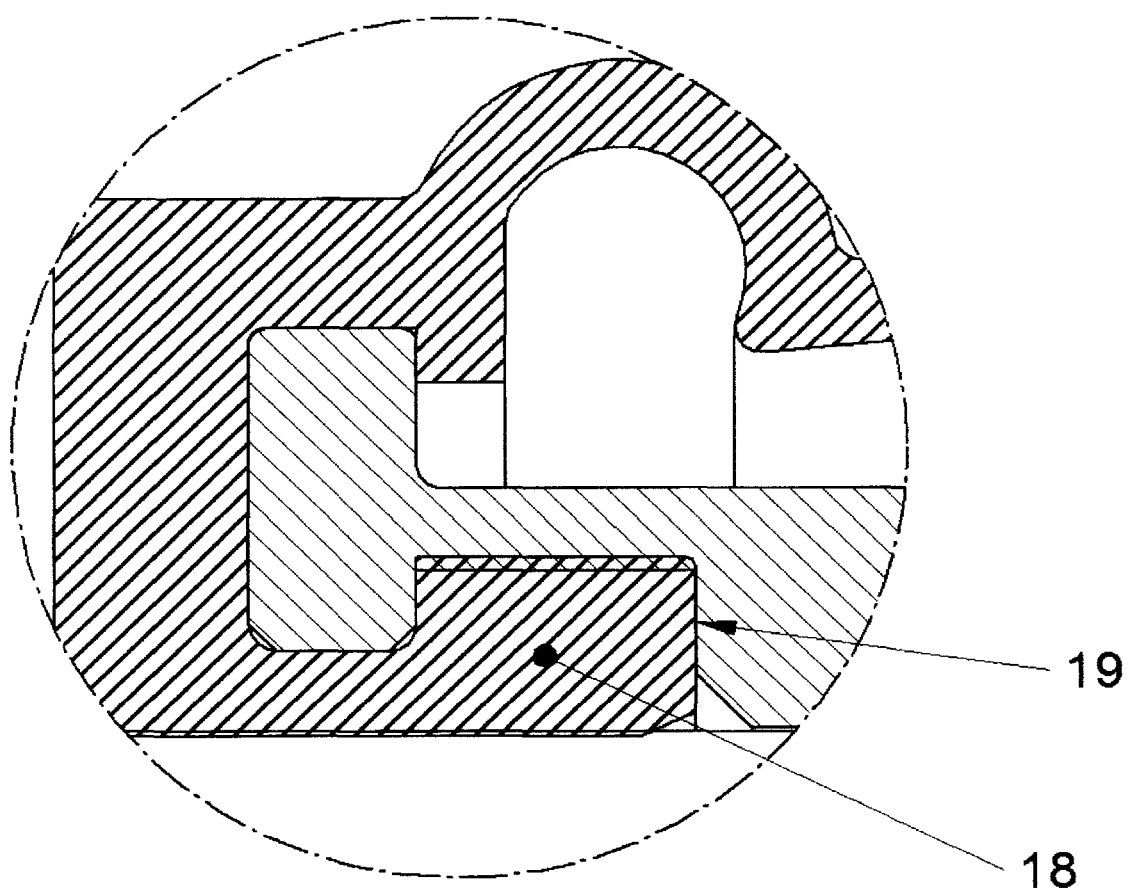
FIG. 3 is a magnified sectional side elevational view of the sealing section between the second member and elastomeric bellows member of the preferred embodiment of FIG. 1.

With reference to FIG. 3, the profile of the elastomeric bellows member 2 contains an outwardly protruding portion 18, which locates into a groove 19 in the inner diameter of the second member 5. The elastomeric bellows member 2 extends radially past the outer diameter of the second member 5 and axially along its outer most diameter. At this portion, the diameter of the second member 5 reduces allowing the elastomeric bellows member to protrude inwardly creating an overlap between the components. These features thereby axially constrain the elastomeric bellows member 2 to the second member 5 during assembly of the present invention 1 to the shaft 3.

Figure 4:
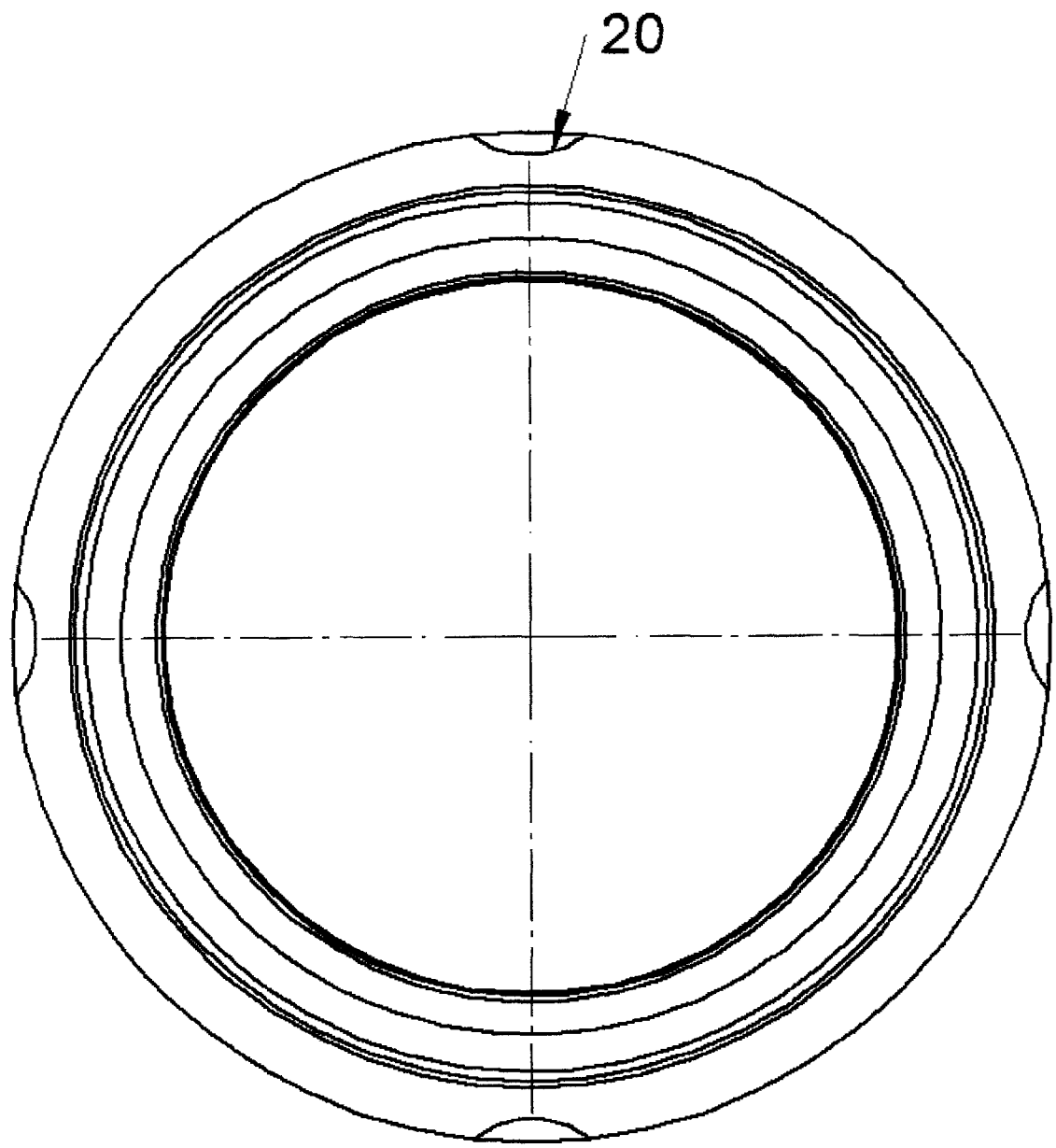
FIG. 4 is a front end elevational view of the present invention showing the scallop sections axially located around the diameter of the third member of the preferred embodiment of FIG. 1.

Referring to FIGS. 1 and 4, one or more cut-outs or scallops 20 are included in the angled portion 19 of the third member 6, thereby providing a flat surface for a fitting tool to engage with to aid assembly of the third member 6 onto the first member 4. These scallops, which are axially located around the diameter of the third member 6, may also act as flow inducing sections mixing the product fluid near the sealing faces 7 and 8.

While only several embodiments of the present invention have been shown and described, it will be obvious to those skilled in the art that many modifications may be made to the present invention without departing from the spirit and scope thereof.

What is claimed is:

1. A mechanical seal, comprising:
a longitudinally floating first member having a seal face;
a longitudinally non-floating second member;
a longitudinally floating third member;
an elastomeric member being in sealing engagement with said longitudinally floating first member, said longitudinally non-floating second member and said longitudinally floating third member, said longitudinally non-floating second member extending along a shaft member and squeezing said elastomeric member into engagement with the shaft member and further having an outer surface with a groove therein for allowing an inwardly protruding portion of said elastomeric member to engage therewith, said elastomeric member having a profile comprising at least one convolution for allowing said longitudinally floating first member and said longitudinally floating third member to move in an axial direction, wherein said at least one convolution extends outwardly when said longitudinally floating first member and said longitudinally floating third member move toward said longitudinally non-floating second member, said at least one convolution permitting a radial distortion of said elastomeric member during installation; and,
spring biasing means longitudinally positioned between said longitudinally floating first member and said longitudinally non-floating second member, with one of said longitudinally floating first member and said longitudinally non-floating second member having a protruding male portion and said longitudinally floating first member and said longitudinally non-floating second member not having said protruding male portion instead having a corresponding female portion into which said protruding male portion locates.

2. The mechanical seal according to claim 1, wherein said seal face of said longitudinally floating first member is a separate, non-integral component from said longitudinally floating first member and is axially and radially retained by said longitudinally floating first member.

3. The mechanical seal according to claim 1, wherein said longitudinally floating third member is engaged with said longitudinally floating first member and forms a cavity in which said elastomeric member is retained.

4. The mechanical seal according to claim 1, wherein said longitudinally floating first member has an annular surface having a diameter which is greater than a diameter of said longitudinally floating third member, thereby permitting annular engagement of said longitudinally floating first member and said longitudinally floating third member.

5. The mechanical seal according to claim 1, wherein said longitudinally floating third member has an outermost surface that is angled for reducing a diameter of a region thereof that is closest to said sealing face of said longitudinally floating first member.

6. The mechanical seal according to claim 1, further comprising at least one scallop located around an axis of a diameter of said longitudinally floating third member.

7. The mechanical seal according to claim 1, wherein said elastomeric member has an inner diameter that is smaller than an outer diameter of longitudinally non-floating second member.

8. The mechanical seal according to claim 1, wherein said longitudinally floating first member has an annular groove and an elastomeric toroidal sealing member located therein.

* * * * *